United States Patent
Chen et al.

(10) Patent No.: US 11,501,672 B1
(45) Date of Patent: Nov. 15, 2022

(54) DISPLAY DEVICE

(71) Applicant: NETRONIX, INC., Jubei (TW)

(72) Inventors: Pei Chun Chen, Hsinchu County (TW); Li Fang Fan, Jubei (TW); Ling Ling Wu, Jubei (TW); Chien Te Hsieh, Jubei (TW)

(73) Assignee: Netronix, Inc., Jubei (TW)

( * ) Notice: Subject to any disclaimer, the term of this patent is extended or adjusted under 35 U.S.C. 154(b) by 0 days.

(21) Appl. No.: 17/505,774

(22) Filed: Oct. 20, 2021

(30) Foreign Application Priority Data

Jul. 9, 2021 (TW) ................. 110208050

(51) Int. Cl.
  *G09F 21/04* (2006.01)
  *B60N 3/02* (2006.01)
(52) U.S. Cl.
  CPC ............... *G09F 21/04* (2013.01); *B60N 3/02* (2013.01)
(58) Field of Classification Search
  CPC ...... G09F 21/04; G09F 2007/183; B60N 3/02
  See application file for complete search history.

(56) References Cited

U.S. PATENT DOCUMENTS

| | | | | |
|---|---|---|---|---|
| 1,812,972 A | * | 7/1931 | Miller | B61D 49/00 40/318 |
| 2,507,875 A | * | 5/1950 | Williams | G09F 15/0037 70/57 |
| 2,759,281 A | * | 8/1956 | Akers, Jr. | G09F 23/00 40/607.03 |
| 4,227,329 A | * | 10/1980 | Decaux | G09F 7/18 40/607.03 |
| 5,054,219 A | * | 10/1991 | Hoyt | G09F 15/0081 40/473 |
| 6,477,800 B1 | * | 11/2002 | Payne | G09F 7/18 40/607.03 |
| 11,254,251 B2 | * | 2/2022 | Wu | B60N 3/02 |
| 2010/0115809 A1 | * | 5/2010 | Pacheco | B60N 3/023 40/318 |
| 2011/0107633 A1 | * | 5/2011 | Wells | G09F 27/007 40/572 |

\* cited by examiner

*Primary Examiner* — Gary C Hoge
(74) *Attorney, Agent, or Firm* — Rosenberg, Klein & Lee

(57) ABSTRACT

A display device installed on the handle of a public transportation vehicle displays advertising information. The display device includes a body and two displays. The body includes a housing. The housing has a first surface, a second surface opposite the first surface, a third surface, and an opening. The housing is provided with a fixed hole penetrating through the first surface and the second surface. The housing is provided with a fixing component therein. The housing is provided with two electronic component-accommodating portions therein. The electronic component-accommodating portions are respectively arranged at two sides of the fixed hole. The third surface and the opening are perpendicular to the first surface and the second surface. The display device can reduce waste of ink and paper due to using advertising papers to advertise.

9 Claims, 6 Drawing Sheets

DISPLAY DEVICE

This application claims priority of Application No. 110208050 filed in Taiwan on 9 Jul. 2021 under 35 U.S.C. § 119; the entire contents of all of which are hereby incorporated by reference.

BACKGROUND OF THE INVENTION

Field of the Invention

The present invention relates to a display, particularly to a display device applied to public transportation vehicles.

Description of the Related Art

The modern public transportation system has a wide range of driving routes that is convenient for people. Many students and office workers choose to commute by transportation. During holidays, many passengers also choose to travel by public transportation. Most businesses are interested in business opportunities such as a large number of passengers and a wide variety of customers taking public transportation and low advertising costs of public transportation, and they have begun to advertise on the lifting rings or grips of trains or buses.

At present, the traditional public transportation system installs transparent acrylic-made shells on the handles and puts advertising papers into the shells. When old advertisements need to be replaced with new advertisements, the personnel must remove the old advertising papers one by one, reprint the new advertising papers, and then put the new advertising papers into the shells. In the long run, it is time-consuming for personnel to remove and put advertising papers. Printing advertising papers is also easy to cause waste of paper ink and paper costs and environmental pollution.

To overcome the abovementioned problems, the present invention provides a display device, so as to solve the afore-mentioned problems of the prior art.

SUMMARY OF THE INVENTION

The primary objective of the present invention is to provide a display device, which is installed on the handle of a public transportation vehicle. The display device can directly display advertising information to reduce waste of ink and paper due to using advertising papers to advertise. The display device has great environmental value and protects the earth's environment.

Another objective of the present invention is to provide a display device whose structure matches various handles. The structure of the display device is simple and convenient to disassemble.

In order to achieve these objectives, the present invention provides a display device installed on the handle of a public transportation vehicle. The display device includes a body and two displays. The body includes a housing, an opening-closing component, and a fixing component. The housing has a first surface, a second surface, a third surface, and an opening. The second surface is opposite to the first surface. The third surface is opposite to the opening. The third surface and the opening are perpendicular to the first surface and the second surface. The housing is provided with a fixed hole penetrating through the first surface and the second surface. The housing is provided with two electronic component-accommodating portions therein. The electronic component-accommodating portions are respectively arranged at two sides of the fixed hole. The opening-closing component, pivoted on the housing, covers the opening. The fixing component is correspondingly arranged in the fixed hole. The displays respectively are arranged on the opening-closing component and the third surface.

In an embodiment of the present invention, the displays are electronic papers.

In an embodiment of the present invention, the fixed hole is a rectangular fixed hole, the fixing component is a rectangular fixing component, and the fixing component is correspondingly fastened with the fixed hole.

In an embodiment of the present invention, the fixing component includes two U-shaped fixing pieces, and the slots of the two U-shaped fixing pieces are correspondingly connected to each other.

In an embodiment of the present invention, the fixing component includes a tube-shaped casing with a through hole, the surface of the tube-shaped casing is provided with a slot that is connected to the through hole.

In an embodiment of the present invention, the tube-shaped casing is a soft tube-shaped casing.

In an embodiment of the present invention, the opening-closing component is pivoted on the housing using a rotational shaft.

In an embodiment of the present invention, the electronic component-accommodating portions are battery-accommodating portions.

In an embodiment of the present invention, the housing is a rectangular housing.

Below, the embodiments are described in detail in cooperation with the drawings to make easily understood the technical contents, characteristics and accomplishments of the present invention.

DETAILED DESCRIPTION OF THE INVENTION

The display device of the present invention can be installed on the handle of a public transportation vehicle, such as grips or lifting rings. The display device displays advertising information for passengers that take public transportation. The present invention uses the display device in order to directly display advertising information. The present invention reduces waste of ink and paper due to using advertising papers to advertise and thus has great environmental value. Besides, the structure of the present invention can match various grips and lifting rings. The structure of the present invention is simple. As a result, the present invention is conveniently assembled with or disassembled from the handle.

Figure 1:
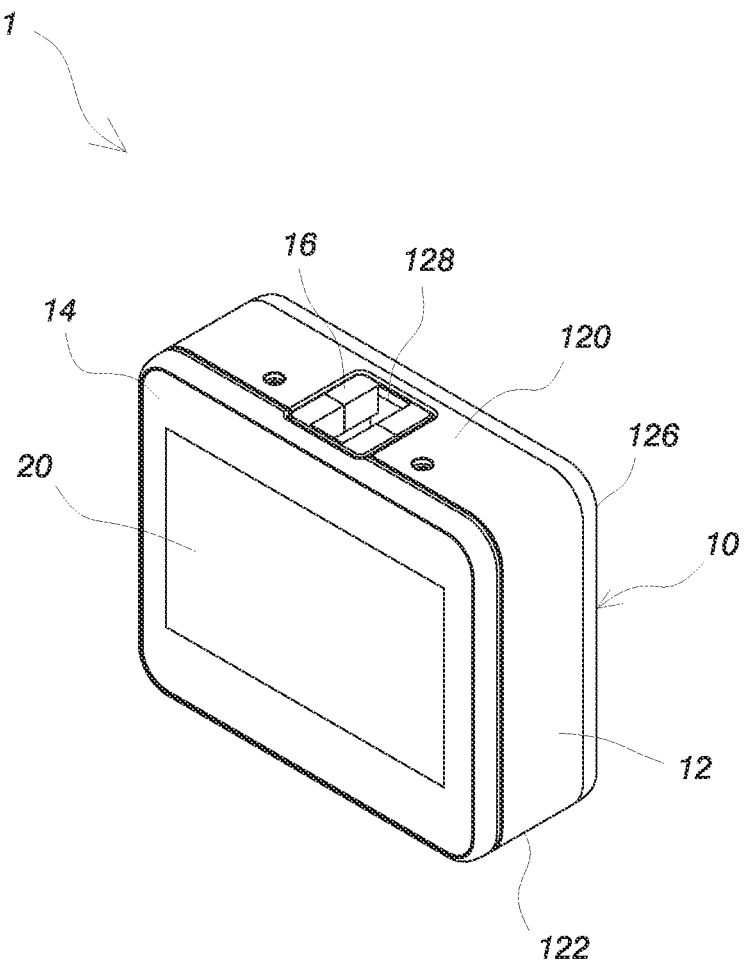
FIG. 1 is a perspective view of a display device according to a first embodiment of the present invention.
Figure 2:
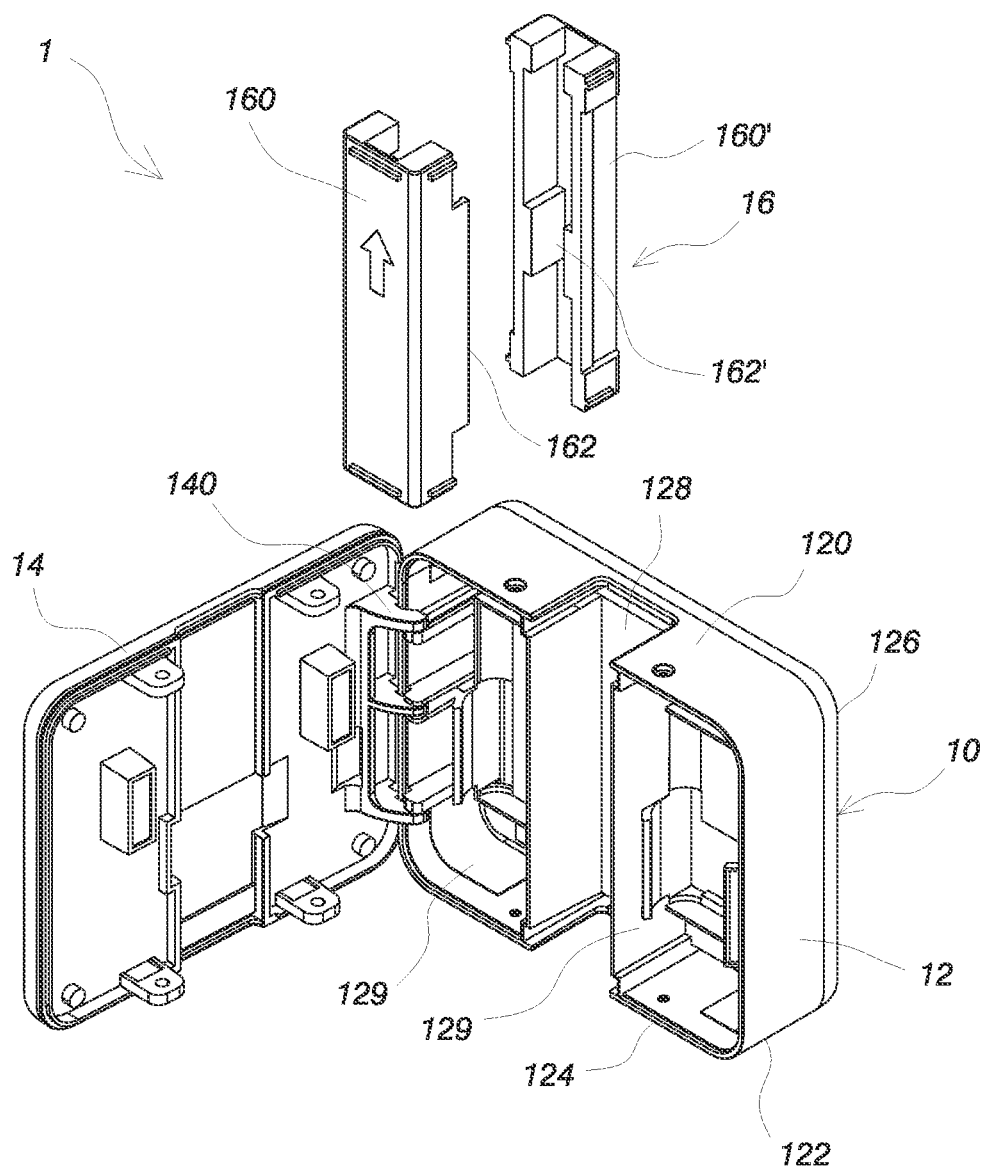
FIG. 2 is an exploded view of a display device according to the first embodiment of the present invention.

Then, the structure of the first embodiment of the present invention is introduced to describe how to achieve the foregoing purposes. Referring to FIG. 1 and FIG. 2, the display device 1 includes a body 10 and two displays 20. The two displays 20 are respectively arranged at two sides of the body 10. The structure of the body 10 includes a housing 12, an opening-closing component 14, and a fixing component 16. The housing 12 is a rectangular housing. The housing has a first surface 120, a second surface 122, an opening 124, and a third surface 126. The second surface 122 is opposite to the first surface 120. The third surface 126 is opposite to the opening 124. The third surface 126 and the opening 124 are perpendicular to the first surface 120 and the second surface 122.

The housing 12 is provided with a fixed hole 128 penetrating through the first surface 120 and the second surface 122. In the embodiment, the fixed hole 128 is a rectangular fixed hole. The fixed hole 128 can divide the interior of the housing 12 into two parts, such that the housing 12 is provided with two electronic component-accommodating portions 129 therein. The electronic component-accommodating portions 129 are respectively arranged at two sides of the fixed hole 128. The electronic component-accommodating portions 129 may be battery-accommodating portions for accommodating batteries. The batteries, electrically connected to the displays 20, provide power for the displays 20.

The opening-closing component 14 is pivoted on the housing 12 using a rotational shaft 140. The shape of the opening-closing component 14 matches that of the opening 124. Thus, the opening-closing component 14 can completely cover the opening 124. The opening-closing component 14 may be opened at the opening 124 of the housing 12 at 90 degrees.

The fixing component 16 is correspondingly arranged in the fixed hole 128. In the embodiment, the fixing component 16 is a rectangular fixing component. The fixing component 16 is correspondingly fastened with the fixed hole 128. In the embodiment, the fixing component 16 includes two U-shaped fixing pieces 160 and 160'. The slots 162 and 162' of the two U-shaped fixing pieces 160 and 160' are correspondingly connected to each other.

The displays 20 are electronic papers. In the embodiment, the two displays 20 are respectively arranged on the opening-closing component 14 and the third surface 126. Thus, the two displays 20 are respectively arranged on two opposite sides of the body 10.

Figure 3:
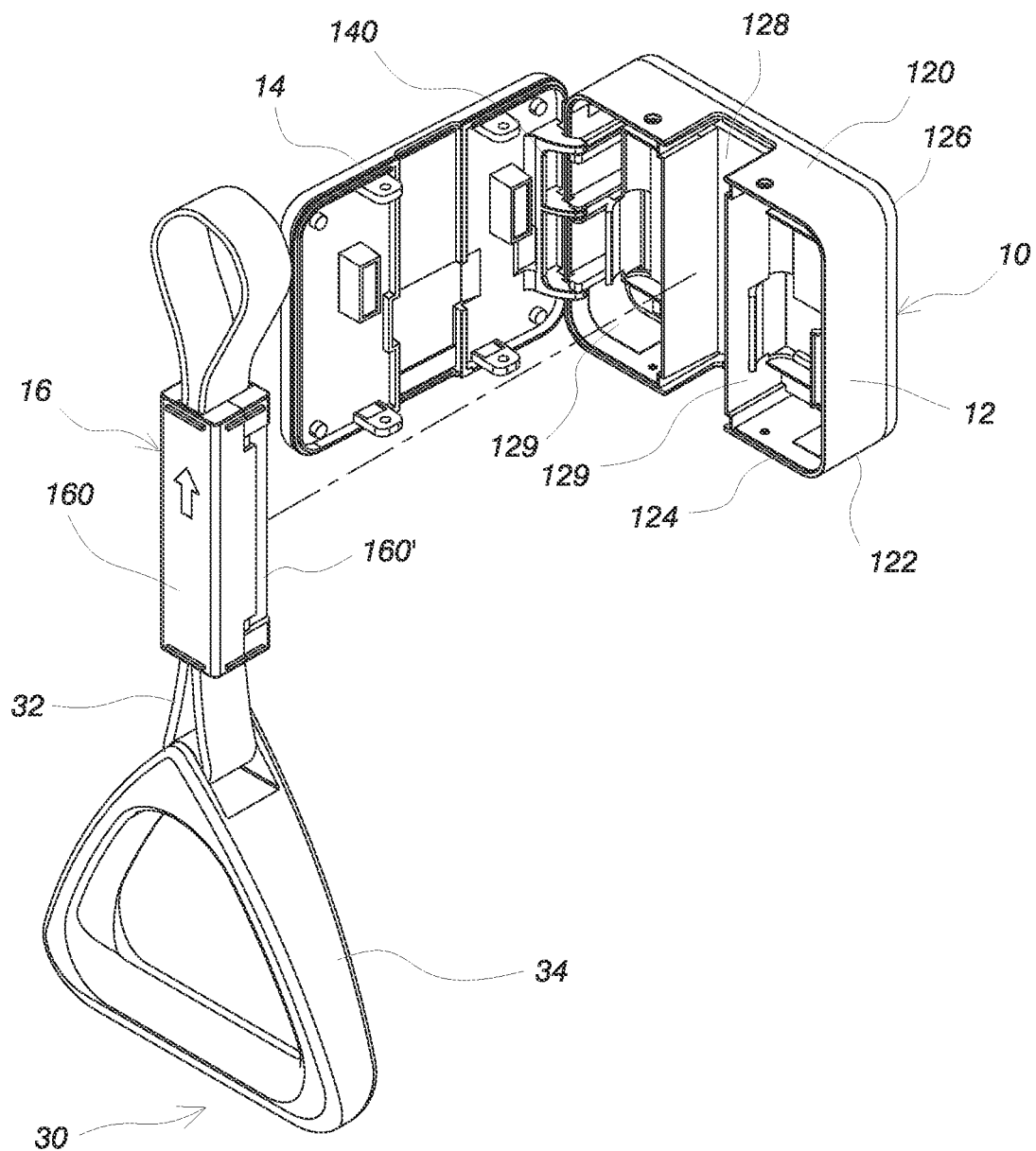
FIG. 3 is a schematic diagram illustrating the state of installing a display device according to the first embodiment of the present invention.
Figure 4:
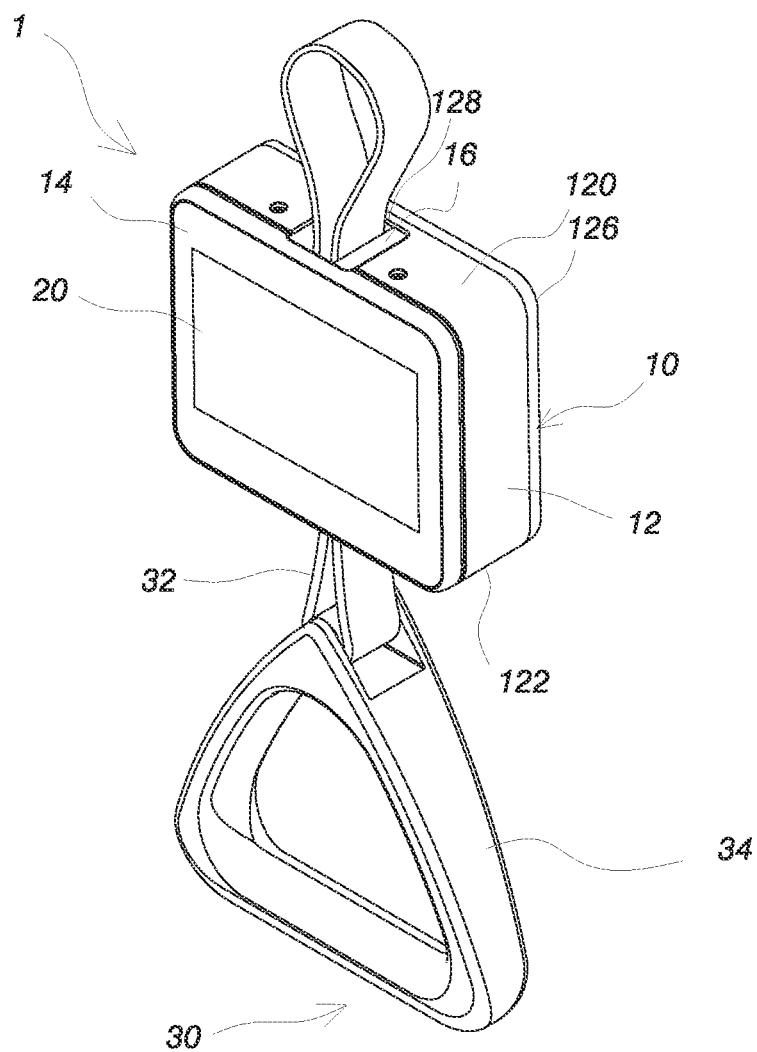
FIG. 4 is a schematic diagram illustrating the state of using a display device according to the first embodiment of the present invention.

After describing the structure of the display device 1, the state of using the display device 1 is introduced as follows. Referring to FIG. 3 and FIG. 4, the embodiment exemplifies the display device 1 installed on the lifting ring 30 of a bus. As illustrated in FIG. 3, the two U-shaped fixing pieces 160, 160' are used to buckle the strap 32 of the lifting ring 30 during installation. Then, the strap 32 and the U-shaped fixing pieces 160, 160' are located in the fixed hole 128. Finally, as illustrated in FIG. 4, the opening-closing component 14 closes and covers the opening 124 to complete the installation of the display device 1. The structure of the present invention is simple and conveniently assembled and disassembled. The fixing component 16 can match any lifting ring and have high flexibility.

The display device 1 is installed on the lifting ring 30. When the passenger holds the handle 34 of the lifting ring 30, the display 20 provides advertising information for the passenger, thereby achieving the advertising purpose.

Figure 5:
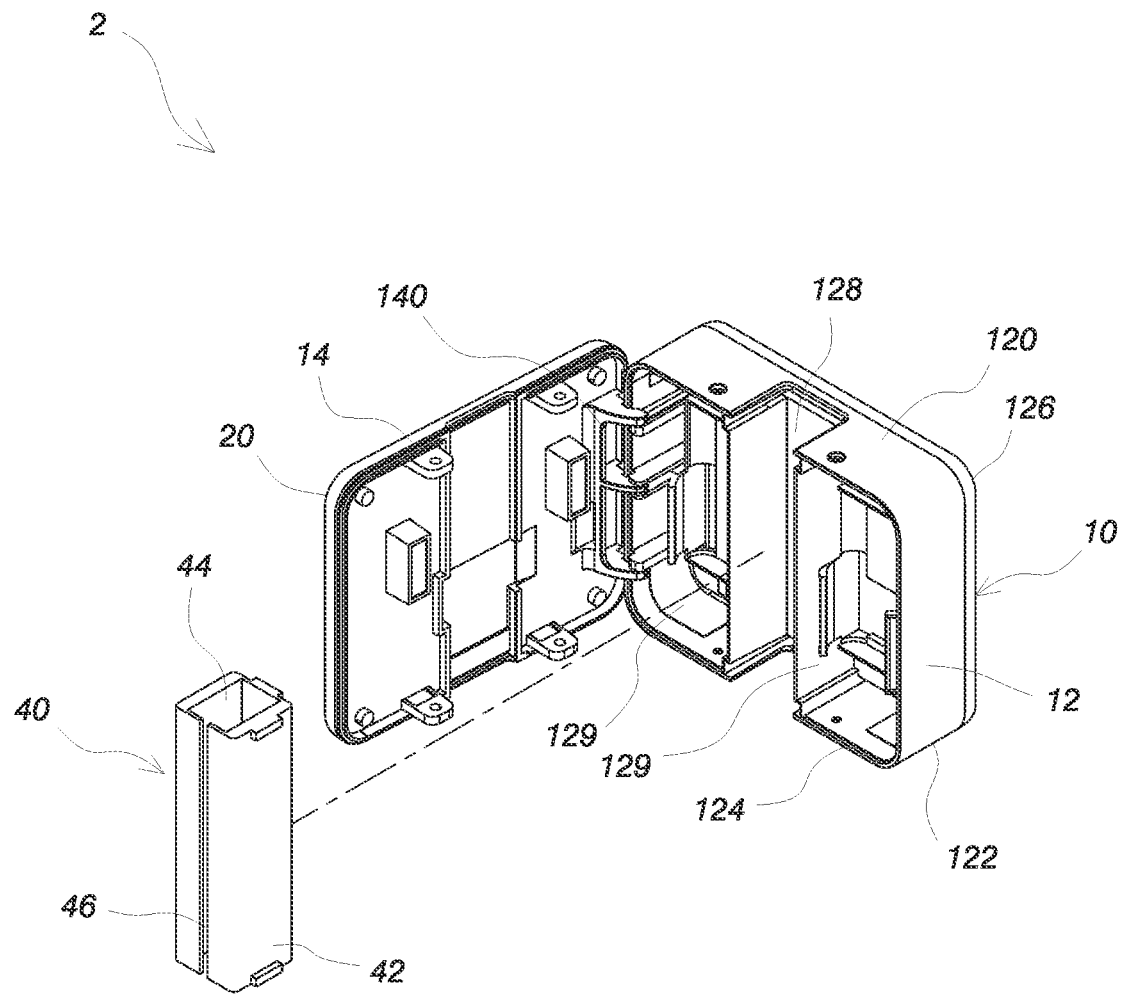
FIG. 5 is an exploded view of a display device according to a second embodiment of the present invention.

In addition to the forgoing embodiment, the present invention further provides a second embodiment. Referring to FIG. 5, the second embodiment is different from the first embodiment in the structure of the fixing component 40 of the display device 2. The structures of the body 10 and the display 20 of the second embodiment are the same as those of the first embodiment so will not reiterated.

The fixed holes and the fixing components of the first embodiment are rectangular. As illustrated in FIG. 5, the fixed holes 128 and the fixing components 40 of the second embodiment are also rectangular. The rectangular fixing component 40 is correspondingly fastened with the rectangular fixed hole 128. The fixing component 40 includes a tube-shaped casing 42 with a through hole 44. The surface of the tube-shaped casing 42 is provided with a slot 46 that is connected to the through hole 44. The tube-shaped casing 42 is a soft tube-shaped casing. The soft tube-shaped casing may be made of a soft plastic used in three-dimensional printing. Accordingly, the fixing component 40 of the embodiment is deformable. The fixing component 40 can match the shape of any handle to improve the performance.

Figure 6:
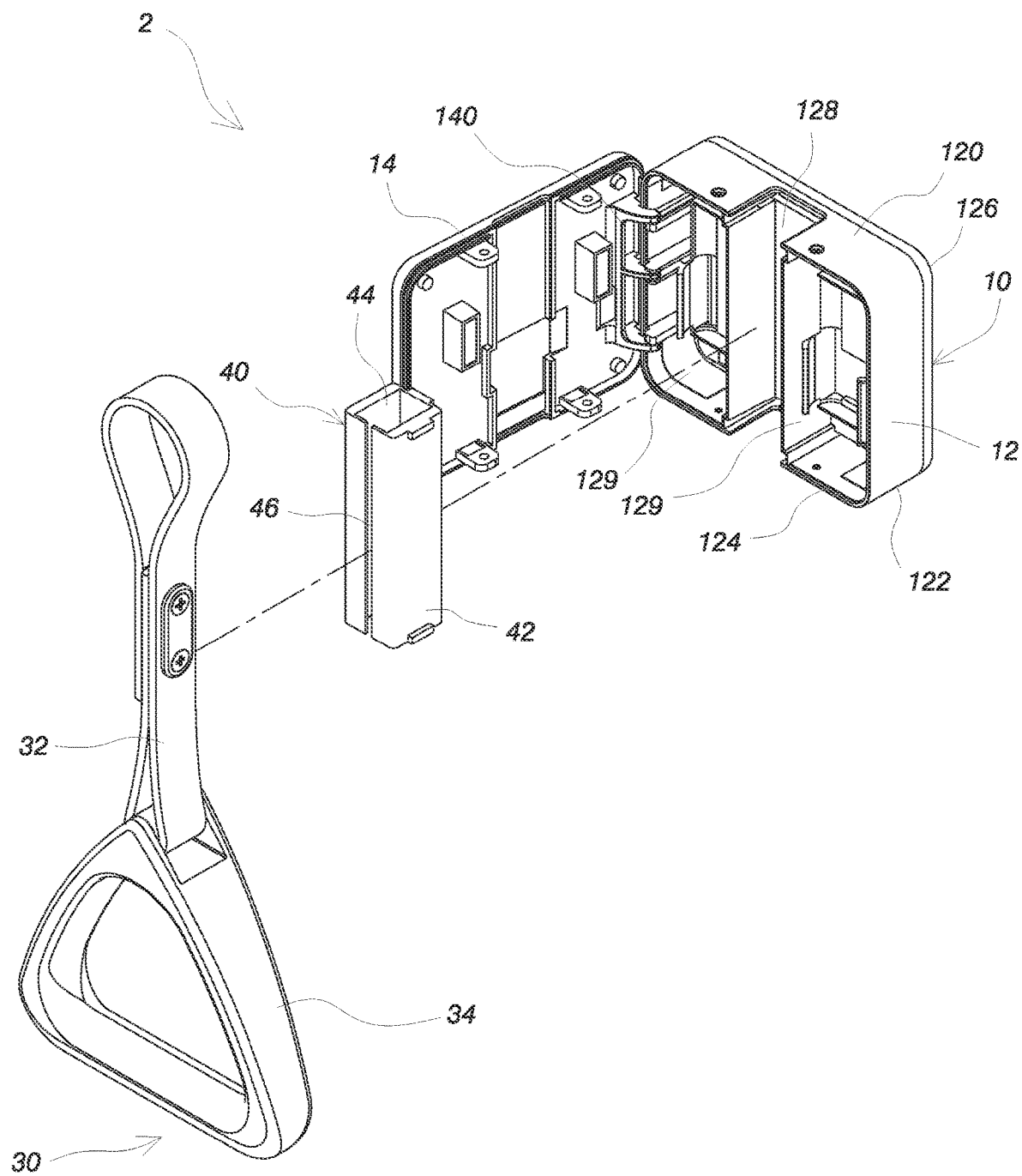
FIG. 6 is a schematic diagram illustrating the state of installing a display device according to the second embodiment of the present invention.

Referring to FIG. 6, the state of installing the display device 2 on the lifting ring 30 is introduced as follows. As illustrated in FIG. 6, when the fixing component 40 is installed on the lifting ring 30, the strap 32 of the lifting ring 30 may enter into the through hole 44 of the tube-shaped casing 42 through a slot 46. Thus, the lifting ring 30 is installed in the fixing component 40. During installation, the handle 32 of the lifting ring 30 rotates with the strap 32 being an axis according to a user requirement. Then, the fixing component 40 and the lifting ring 30 are arranged in the fixed hole 128. The opening-closing component 14 closes and covers the opening 124 to complete the installation of the display device 2.

In conclusion, the display device is installed on the handle of a public transportation vehicle. The display device can directly display advertising information to reduce waste of ink and paper due to using advertising papers to advertise. The display device has great environmental value and protects the earth's environment. Besides, the structure of the display device matches various handles. The structure of the display device is simple and convenient to disassemble.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A display device, installed on a handle of a public transportation vehicle, displaying advertising information and comprising:
   a body comprising:
      a housing having a first surface, a second surface, a third surface, and an opening, wherein the second surface is opposite to the first surface, the third surface is opposite to the opening, the third surface and the opening are perpendicular to the first surface and the second surface, the housing is provided with a fixed hole penetrating through the first surface and the second surface, the housing is provided with two electronic component-accommodating portions therein, and the electronic component-accommodating portions are respectively arranged at two sides of the fixed hole;
   an opening-closing component, pivoted on the housing, covering the opening; and a fixing component correspondingly arranged in the fixed hole; and two displays respectively arranged on the opening-closing component and the third surface.

2. The display device according to claim 1, wherein the displays are electronic papers.

3. The display device according to claim 1, wherein the fixed hole is a rectangular fixed hole, the fixing component is a rectangular fixing component, and the fixing component is correspondingly fastened with the fixed hole.

4. The display device according to claim 3, wherein the fixing component includes two U-shaped fixing pieces, and slots of the two U-shaped fixing pieces are correspondingly connected to each other.

5. The display device according to claim 1, wherein the fixing component includes a tube-shaped casing with a through hole, a surface of the tube-shaped casing is provided with a slot that is connected to the through hole.

6. The display device according to claim 5, wherein the tube-shaped casing is a soft tube-shaped casing.

7. The display device according to claim 1, wherein the opening-closing component is pivoted on the housing using a rotational shaft.

8. The display device according to claim 1, wherein the electronic component-accommodating portions are battery-accommodating portions.

9. The display device according to claim 1, wherein the housing is a rectangular housing.

\* \* \* \* \*